US005783151A

United States Patent [19]

Haroldson

[11] Patent Number: 5,783,151

[45] Date of Patent: Jul. 21, 1998

[54] CONCEALER AND METHOD OF MAKING SAME

[76] Inventor: Sandra Lee Haroldson, 11019 NE. 141st St., Kirkland, Wash. 98034

[21] Appl. No.: 884,444

[22] Filed: Jun. 27, 1997

Related U.S. Application Data

[60] Provisional application No. 60/020/636 Jun. 27, 1996.

[51] Int. Cl.[6] ..... B32B 35/00

[52] U.S. Cl. ..... 427/140; 106/266; 106/272; 106/416; 106/486; 106/31.07; 106/31.08; 427/299; 427/355; 427/429; 446/268

[58] Field of Search ..... 106/31.07, 31.08, 106/266, 272, 416, 486; 427/140, 299, 355, 429; 446/268

[56] References Cited

U.S. PATENT DOCUMENTS

| | | | |
|---|---|---|---|
| 3,953,218 | 4/1976 | Pollard | 106/266 X |
| 4,768,987 | 9/1988 | Usai et al. | 106/31.08 X |
| 4,865,097 | 9/1989 | Allen | 446/268 X |
| 5,168,083 | 12/1992 | Matthews et al. | 106/486 X |
| 5,383,954 | 1/1995 | Craig | 106/31.07 X |

*Primary Examiner*—Michael Lusignan
*Attorney, Agent, or Firm*—Paul L. Griffiths

[57] ABSTRACT

A preparation for concealing crazing in antique composition dolls. The method of making a concealer from various pigments and other compounds is disclosed. A method of using the preparation for repairing crazing marks on antique dolls is also disclosed.

5 Claims, No Drawings

CONCEALER AND METHOD OF MAKING SAME

This application relates to provisional application Ser. No. 60/020,636 filed Jun. 27, 1996.

TECHNICAL FIELD

The present invention relates to antique composition dolls, and more particularly, it relates to the preparation of a concealer and a method of using that concealer for repairing damage to said dolls caused by crazing.

BACKGROUND ART

In the early to mid-1900's dolls were made from a composition material, generally a mixture of wood pulp and glue. These dolls are now collectors items, second only to coins and stamps in popularity. Over time crazing can occur on a doll's painted surfaces. Crazing is a fine network of small cracks that form in a painted layer or in an outer layer of the composition material. Crazing is usually the result of variations in humidity and temperature that cause a painted layer and the composition material to expand at different rates causing the cracks to form. Crazing dramatically effects the aesthetic appearance of a doll and a corresponding drop in the value of the doll.

Restoration of a doll is both risky and expensive. It can also take a long time since the best restorers are very busy. A poor restoration can drastically reduce the value of a doll. Restoration is done by removing the existing paint and applying new paint, somewhat changing the true character of a doll. The present invention provides a safe and relatively inexpensive method for cosmetically enhancing a doll. The present invention does not remove or cover up the original paint, thereby retaining the original character and value of a doll.

SUMMARY OF THE INVENTION

A preparation of pigments, kaolin clay, titanium dioxide, calcium stearate, stearic acid, hydrogenated fish oil and waxes are blended together to provide a semi-solid preparation for concealing crazing cracks on composition dolls. The preparation is applied to a clean and dust free area of a doll to be treated. A concealer of proper color is selected, blush being used for cheeks, elbows, knees, and tops of hands. Flesh color concealer is used for all skin colored surfaces. Using a soft lint free cloth, a small amount of the preparation is spread onto the section to be treated. Do not use the preparation on painted facial areas. Excess preparation is then immediately wiped off with a clean dry cloth. Buffing is to be avoided. Repeat the procedure on the next area to be treated.

BRIEF DESCRIPTION OF THE DRAWINGS

There are no drawings.

BEST MODE FOR CARRYING OUT THE INVENTION

The following is a description of ingredients for making a flesh tone concealer preparation for covering crazing on composition dolls. The basic ingredients (source in parentheses) are: water; mapico yellow dark orange 4100; mapico yellow 71050 (Mapico, Inc. St. Louis, Mo.); clarion Red (Sun Chemical, Amelia, Ohio); kaolin clay (Integra Chemical, Renton, Wash.); titanium dioxide (Integra); calcium stearate (Integra); stearic acid (Integra); hydrogenated fish oil (Sigma Chemical Co., St. Louis, Mo.); Multiwax 445 (Witco Chemical Co., Greenwich, Conn.); ethyl paraben (Integra); methyl paraben (Integra); and methylcellulose K-15 (Dow Chemical Co, Mo.).

A blush tone concealer uses the same basic ingredients in different amounts of pigment and no yellow, as further described below.

The preferred preparation for flesh tone contains the following ingredient amounts for making one (1) kilogram (kg): 1,600 ml water; 20 grams of mapico yellow dark orange 4100; 50 grams of mapico yellow 71050; 5 grams of clarion Red; 200 grams of kaolin clay; 300 grams of titanium dioxide; 105 grams of calcium stearate; 110 grams of stearic acid; 110 grams hydrogenated fish oil; 50 grams Multiwax 445; 5 grams ethyl paraben (as a preservative); 5 grams methyl paraben (as a preservative); and 25 grams methylcellulose K-15. For blush preparations, use 15 grams of clarion red, 40 grams of mapico yellow dark orange and no mapico yellow 71050.

The preparation is made using the following steps:

first pour water heated to 50°–60° C. into an appropriate sized mixing vessel;

begin mixing with a Silverson high shear mixer operating at about 8,00 rpm;

slowly add the pigments to the mixing vessel while continuing to mix;

mix for five minutes, add the kaolin clay and mix for another five minutes;

add titanium dioxide and continue mixing for another ten minutes;

simultaneously mix calcium stearate, stearic acid, multiwax 445 together as solids and melt while stirring slowly;

carefully and gently add the liquid wax mixture to the mix containing the pigments in a manner such that foaming is minimized;

continue mixing for at 8,000 rpm for ten minutes, during which time the ethyl paraben and methyl paraben are added and add methylcellulose to thicken, continue mixing an additional five to ten minutes. The preparation is very viscous but can be readily poured into appropriate containers. After the preparation cools it has a consistency similar to soap.

A method of using the preparation comprises the steps of: cleaning and making dust free an area of a doll to be treated; selecting a concealer of proper color, blush being used for cheeks, elbows, knees, and tops of hands; flesh color concealer is used for all skin colored surfaces. Using a soft lint free cloth, a small amount of the preparation is spread onto the section to be treated. Do not use the preparation on painted facial areas. Excess preparation is then immediately wiped off with a clean dry cloth. Buffing is to be avoided. Repeat the procedure on the next area to be treated.

In compliance with the statute, the invention has been described in language more or less specific as to its features. It is to be understood, however, that the invention is not limited to the specific formulations given, since the means and preparation herein disclosed comprise a preferred form of putting the invention into effect. The invention is, therefore, claimed in any of its forms or modifications within the legitimate and valid scope of the appended claims, appropriately interpreted in accordance with the doctrine of equivalents.

I claim:

1. A preparation for concealing crazing on composition dolls comprising effective concealing amounts of: water; mapico yellow dark orange 4100; mapico yellow 71050; clarion Red; kaolin clay; titanium dioxide; calcium stearate; stearic acid; hydrogenated fish oil; Multiwax 445; ethyl paraben; methyl paraben; and methylcellulose K-15.

2. A preparation according to claim 1, wherein one (1) kilogram (kg) of said preparation is made from: 1,600 ml water; 20 grams of mapico yellow dark orange 4100; 50 grams of mapico yellow 71050; 5 grams of clarion Red; 200 grams of kaolin clay; 300 grams of titanium dioxide; 105 grams of calcium stearate; 110 grams of stearic acid; 110 grams hydrogenated fish oil; 50 grams Multiwax 445; 5 grams ethyl paraben; 5 grams methyl paraben; and 25 grams methylcellulose K-15.

3. A preparation according to claim 1, wherein one (1) kilogram (kg) of said preparation is made from: 1,600 ml water; 40 grams of mapico yellow dark orange 4100; 15 grams of clarion Red; 200 grams of kaolin clay; 300 grams of titanium dioxide; 105 grams of calcium stearate; 110 grams of stearic acid; 110 grams hydrogenated fish oil; 50 grams Multiwax 445; 5 grams ethyl paraben; 5 grams methyl paraben; and 25 grams methylcellulose K-15.

4. A method of preparing a concealer for covering crazing on composition dolls comprising the steps of: pouring water heated to 50°–60° C. into an appropriate sized mixing vessel;

mixing with a Silverson high shear mixer operating at about 8.00 rpm;

slowly adding pigments to said mixing vessel while continuing to mix;

mixing for five minutes, adding kaolin clay and mixing for another five minutes;

adding titanium dioxide and continuing to mix for another ten minutes;

simultaneously mixing calcium stearate, stearic acid, and multiwax 445 together as solids and melting them while stirring slowly;

carefully and gently adding said melted wax mixture to said mixing vessel containing mixed pigments in a manner such that foaming is minimized;

continuing to mix at 8,000 rpm for ten minutes, during which time ethyl paraben and methyl paraben are added and adding methylcellulose to thicken, continuing to mix an additional five to ten minutes.

5. A method of using a concealer preparation comprising the steps of: cleaning and making dust free an area of a doll to be treated; selecting a concealer of proper color, placing a small amount of said preparation onto a soft lint free cloth, spreading said preparation onto a section to be treated, wiping excess preparation off with a clean dry cloth.

* * * * *